United States Patent
Tuukkanen et al.

(10) Patent No.: US 10,046,767 B2
(45) Date of Patent: Aug. 14, 2018

(54) APPARATUS, METHOD AND COMPUTER PROGRAM FOR ENABLING CONTROL OF A VEHICLE

(71) Applicant: HERE Global B.V., Eindhoven (NL)

(72) Inventors: Marko Tuukkanen, Schlenzer (DE); Jerome Beaurepaire, Berlin (DE); Ari Aarnio, Espoo (FI)

(73) Assignee: HERE Global B.V., Eindhoven (NL)

( * ) Notice: Subject to any disclaimer, the term of this patent is extended or adjusted under 35 U.S.C. 154(b) by 39 days.

(21) Appl. No.: 15/105,276

(22) PCT Filed: Dec. 17, 2014

(86) PCT No.: PCT/EP2014/078204
§ 371 (c)(1),
(2) Date: Jun. 16, 2016

(87) PCT Pub. No.: WO2015/091636
PCT Pub. Date: Jun. 25, 2015

(65) Prior Publication Data
US 2016/0318516 A1    Nov. 3, 2016

(30) Foreign Application Priority Data

Dec. 19, 2013  (GB) .................................. 1322493.6
Feb. 12, 2014  (GB) .................................. 1402374.1

(51) Int. Cl.
*B60W 30/182* (2012.01)
*B60W 30/09* (2012.01)
(Continued)

(52) U.S. Cl.
CPC .......... *B60W 30/182* (2013.01); *B60W 30/09* (2013.01); *B60W 30/18* (2013.01);
(Continued)

(58) Field of Classification Search
CPC .... B60W 30/182; B60W 30/09; B60W 30/18; B60W 50/00; B60W 2050/0077;
(Continued)

(56) References Cited

U.S. PATENT DOCUMENTS 5,570,285 A * 10/1996 Asaka .................. G05D 1/0214
                                                   180/169
5,612,668 A    3/1997 Scott
(Continued)

FOREIGN PATENT DOCUMENTS

DE    10 2012 008659 A1    11/2012
EP        1 422 680 A2     5/2004
(Continued)

OTHER PUBLICATIONS

International Search Report and Written Opinion for Application No. PCT/EP2014/078204 dated Mar. 24, 2015.
(Continued)

*Primary Examiner* — Calvin Cheung
(74) *Attorney, Agent, or Firm* — Alston & Bird LLP (57) ABSTRACT

An apparatus, method and computer program the apparatus comprising: processing circuitry (5); and memory circuitry (7) including computer program code (11); the memory circuitry and the computer program code configured to, with the processing circuitry, cause the apparatus at least to perform: obtaining information from a plurality of sensors wherein the plurality of sensors are located on a plurality of vehicles; analyzing the obtained information to determine whether at least one vehicle is exposed to risk; and if it is determined that at least one vehicle is exposed to risk, enabling one or more of the plurality of vehicles to activate a defensive mode of operation.

20 Claims, 8 Drawing Sheets

(51) Int. Cl.
| | |
|---|---|
| *G08G 1/0968* | (2006.01) |
| *G08G 1/00* | (2006.01) |
| *H04W 4/04* | (2009.01) |
| *G01C 21/34* | (2006.01) |
| *G08G 1/01* | (2006.01) |
| *B60W 50/00* | (2006.01) |
| *G05D 1/00* | (2006.01) |
| *B60W 30/18* | (2012.01) |
| *H04W 4/90* | (2018.01) |

(52) U.S. Cl.
CPC ......... *B60W 50/00* (2013.01); *G01C 21/3415* (2013.01); *G01C 21/3461* (2013.01); *G05D 1/0088* (2013.01); *G08G 1/0104* (2013.01); *G08G 1/0112* (2013.01); *G08G 1/0129* (2013.01); *G08G 1/096816* (2013.01); *G08G 1/096827* (2013.01); *G08G 1/096838* (2013.01); *G08G 1/096844* (2013.01); *G08G 1/205* (2013.01); *H04W 4/046* (2013.01); *H04W 4/90* (2018.02); *B60W 2050/0077* (2013.01); *B60W 2550/40* (2013.01); *B60W 2550/408* (2013.01); *B60W 2900/00* (2013.01)

(58) Field of Classification Search
CPC ....... B60W 2550/40; B60W 2550/408; B60W 2900/00; G01C 21/3415; G01C 21/3461; G05D 1/0088; G08G 1/0104; G08G 1/0112; G08G 1/0129; G08G 1/096816; G08G 1/096827; G08G 1/096838; G08G 1/096844; G08G 1/205; H04W 4/046; H04W 4/22
See application file for complete search history.

(56) References Cited

U.S. PATENT DOCUMENTS

| | | | |
|---|---|---|---|
| 5,801,618 A | | 9/1998 | Jenkins |
| 5,870,303 A * | | 2/1999 | Trovato ............. B62D 15/0285 |
| | | | 700/255 |
| 5,983,161 A | | 11/1999 | Lemelson et al. |
| 6,804,607 B1 * | | 10/2004 | Wood ...................... G01S 3/784 |
| | | | 180/167 |
| 7,349,768 B2 | | 3/2008 | Bruce et al. |
| 7,426,437 B2 | | 9/2008 | Breed et al. |
| 7,936,286 B2 | | 5/2011 | Adair |
| 8,000,887 B2 | | 8/2011 | Nathan et al. |
| 8,315,792 B2 | | 11/2012 | Speier et al. |
| 8,344,864 B1 | | 1/2013 | Al-Mutawa |
| 8,406,986 B2 | | 3/2013 | Boss et al. |
| 8,494,675 B2 * | | 7/2013 | Ichinose ................ G05D 1/024 |
| | | | 700/245 |
| 8,630,789 B2 | | 1/2014 | Speiser |
| 8,738,276 B1 | | 5/2014 | Boss et al. |
| 8,849,551 B2 | | 9/2014 | Gadler |
| 8,903,640 B2 * | | 12/2014 | Caminiti .............. G08G 1/0104 |
| | | | 340/436 |
| 9,464,907 B1 | | 10/2016 | Hoareau et al. |
| 9,495,874 B1 * | | 11/2016 | Zhu .......................... G06N 3/00 |
| 2002/0019703 A1 * | | 2/2002 | Levine .................... B60Q 1/346 |
| | | | 701/301 |
| 2005/0231335 A1 | | 10/2005 | Miller, Jr. et al. |
| 2006/0200302 A1 | | 9/2006 | Seko |
| 2007/0043502 A1 | | 2/2007 | Mudalige et al. |
| 2007/0075847 A1 | | 4/2007 | Oyagi et al. |
| 2007/0152804 A1 * | | 7/2007 | Breed ................... B60N 2/2863 |
| | | | 340/435 |
| 2007/0198168 A1 | | 8/2007 | Nathan et al. |
| 2007/0225993 A1 | | 9/2007 | Moore |
| 2008/0004790 A1 | | 1/2008 | Ames |
| 2008/0012693 A1 | | 1/2008 | Shimomura |
| 2008/0046134 A1 | | 2/2008 | Bruce et al. |
| 2009/0027253 A1 * | | 1/2009 | van Tooren ......... G01S 13/9303 |
| | | | 342/29 |
| 2009/0030603 A1 | | 1/2009 | Madalin, Jr. et al. |
| 2009/0228157 A1 | | 9/2009 | Breed |
| 2009/0248219 A1 | | 10/2009 | Kawauchi et al. |
| 2010/0121575 A1 * | | 5/2010 | Aldridge .............. G08G 5/0069 |
| | | | 701/301 |
| 2010/0305857 A1 * | | 12/2010 | Byrne ...................... G06T 7/73 |
| | | | 701/301 |
| 2011/0130636 A1 | | 6/2011 | Daniel et al. |
| 2011/0136463 A1 | | 6/2011 | Ebdon et al. |
| 2011/0264360 A1 | | 10/2011 | Boss et al. |
| 2012/0314074 A1 * | | 12/2012 | Aimura .............. G06K 9/00362 |
| | | | 348/148 |
| 2013/0018549 A1 | | 1/2013 | Kobana et al. |
| 2013/0103309 A1 | | 4/2013 | Cai et al. |
| 2013/0116922 A1 | | 5/2013 | Cai et al. |
| 2013/0211656 A1 | | 8/2013 | An et al. |
| 2013/0332402 A1 | | 12/2013 | Rakshit |
| 2014/0129122 A1 | | 5/2014 | Boss et al. |
| 2015/0006012 A1 | | 1/2015 | Kammel et al. |
| 2015/0170287 A1 * | | 6/2015 | Tirone ................... G06Q 40/08 |
| | | | 705/4 |
| 2017/0108342 A1 | | 4/2017 | Foreman et al. |
| 2017/0199044 A1 | | 7/2017 | Hoareau et al. |

FOREIGN PATENT DOCUMENTS

| | | |
|---|---|---|
| GB | 2 375 208 A | 11/2002 |
| GB | 2 383 431 A | 6/2003 |
| JP | S59109915 A | 6/1984 |
| JP | 2007 206915 A | 8/2007 |
| JP | 2010 020371 A | 1/2010 |
| WO | WO 2012/124877 A1 | 9/2012 |
| WO | WO 2013/072095 A1 | 5/2013 |
| WO | WO 2013/074983 A1 | 5/2013 |
| WO | WO 2013/100993 A1 | 7/2013 |
| WO | WO 2013/158355 A1 | 10/2013 |

OTHER PUBLICATIONS

International Search Report and Written Opinion for Application No. PCT/EP2014/078205 dated Mar. 23, 2015.
Kyung-Bok, S et al., *Autonomous Vehicle Guidance System With Infrastructure*, 7$^{th}$ International Conference on Signal Processing and Communication Systems (ICSPCS) IEEE (Dec. 2013) pp. 1-6.
Papadimitratos, P. et al., *Vehicular Communication Systems: Enabling Technologies, Applications, and Future Outlook on Intelligent Transportation*, IEEE Communications Magazine, vol. 47, No. 1 (Nov. 2009) pp. 84-95.
Sun, Q. et al., *Using Ad-hoc Inter-vehicle Networks for Regional Alerts*, Stanford, Technical Report (2005) 22 pages.
Self-driving cars offer big benefits if they can overcome hurdles [online] [retrieved Nov. 7, 2013]. Retrieved from the Internet: <URL: newsday.com/.../self-driving-cars-offer-big-benefits-if-they-can-overcome-hurdles-1.6305713>. (dated Oct. 23, 2013) 3 pages.
Search Report for Great Britain Application No. GB 1322493.6 dated Jul. 25, 2014.
Search Report for Great Britain Application No. GB 1402374.1 dated Jul. 31, 2014.
U.S. Appl. No. 15/105,295, filed Jun. 16, 2016, in re: Tuukkanen et al., entitled An Apparatus, Method, and Computer Program for Controlling a Vehicle.
Office Action for U.S. Appl. No. 15/105,295 dated Aug. 24, 2017, 27 pages.

* cited by examiner

APPARATUS, METHOD AND COMPUTER PROGRAM FOR ENABLING CONTROL OF A VEHICLE

CROSS REFERENCE TO RELATED APPLICATIONS

This application is a national stage 371 application of International Application No. PCT/EP2014/078204, filed Dec. 17, 2014, which claims priority to GB Application No. 1402374.1, filed Feb. 2, 2014 and also GB Application No. 1322493.6, filed Dec. 19, 2013, the entire contents of each are hereby incorporated by reference.

TECHNOLOGICAL FIELD

Examples of the present disclosure relate to an apparatus, method and computer program for enabling control of a vehicle. In particular, they relate to enabling control of a vehicle to protect the vehicle and/or a user of the vehicle.

BACKGROUND

Vehicles such as cars may be configured with a plurality of sensors. The sensors may be configured to obtain information which may be used, for example, to enable autonomous control of a vehicle.

Some vehicles may also be configured to enable communication. For example a vehicle may be able to use a communications network to communicate with navigation application or with the owner of vehicle.

Where vehicles have such capabilities it may be useful to use these to avoid certain situations for the vehicles and people around the vehicle.

BRIEF SUMMARY

According to various, but not necessarily all, examples of the disclosure there may be provided apparatus comprising: processing circuitry; and memory circuitry including computer program code; the memory circuitry and the computer program code configured to, with the processing circuitry, cause the apparatus at least to perform: obtaining information from a plurality sensors wherein the plurality of sensors are located on a plurality of vehicles; analysing the obtained information to determine whether at least one vehicle is exposed to risk; and if it is determined that at least one vehicle is exposed to risk, enabling one or more of the plurality of vehicles to activate a defensive mode of operation wherein the defensive mode of operation comprises autonomously controlling at least one vehicle to move away from the risk.

In some examples at least one vehicle may be determined to be exposed to risk if the information obtained from the plurality of sensors comprises a predetermined pattern.

In some examples at least one vehicle may be determined to be at risk if the information obtained from the plurality of sensors is above a threshold.

In some examples the information obtained from the plurality of sensors may enable the activity of at least one person to be monitored.

In some examples the information which is obtained may be analysed to define a category of risk which at least one vehicle is exposed to. The functions performed in the defensive mode of operation may be determined by the category of risk which the at least one vehicle is exposed to.

In some examples the defensive mode of operation may comprise providing information to other vehicles.

In some examples the defensive mode of operation may comprise contacting users of vehicles.

In some examples the defensive mode of operation may comprise enabling tracking of an object.

In some examples the defensive mode of operation may comprise autonomously controlling at least one vehicle to move back to its original location if the risk is removed.

According to various, but not necessarily all, examples of the disclosure there may be provided a vehicle comprising an apparatus as described above.

According to various, but not necessarily all, examples of the disclosure there may be provided a server comprising an apparatus as described above wherein the server is configured to communicate with at least one vehicle.

According to various, but not necessarily all, examples of the disclosure there may be provided a method comprising: obtaining information from a plurality of sensors wherein the plurality of sensors are located on a plurality of vehicles; analysing the obtained information to determine whether at least one vehicle is exposed to risk; and if it is determined that at least one vehicle is exposed to risk, enabling one or more of the plurality of vehicles to activate a defensive mode of operation wherein the defensive mode of operation comprises autonomously controlling at least one vehicle to move away from the risk.

In some examples at least one vehicle may be determined to be exposed to risk if the information obtained from the plurality of sensors comprises a predetermined pattern.

In some examples at least one vehicle may be determined to be at risk if the information obtained from the plurality of sensors is above a threshold.

In some examples the method may also comprise using the information obtained from the plurality of sensors to enable monitoring of the activity of at least one person.

In some examples the method may comprise analysing the information to define a category of risk which at least one vehicle is exposed to. The functions performed in the defensive mode of operation may be determined by the category of risk which the at least one vehicle is exposed to.

In some examples the defensive mode of operation may comprise providing information to other vehicles.

In some examples the defensive mode of operation may comprise contacting users of vehicles.

In some examples the defensive mode of operation may comprise enabling tracking of an object.

According to various, but not necessarily all, examples of the disclosure there may be provided a computer program comprising computer program instructions that, when executed by processing circuitry, enable: obtaining information from a plurality of sensors wherein the plurality of sensors are located on a plurality of vehicles; analysing the obtained information to determine whether at least one vehicle is exposed to risk; and if it is determined that at least one vehicle is exposed to risk, enabling one or more of the plurality of vehicles to activate a defensive mode of operation wherein the defensive mode of operation comprises autonomously controlling at least one vehicle to move away from the risk.

According to various, but not necessarily all, examples of the disclosure there may be provided a computer program comprising program instructions for causing a computer to perform the methods described above.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

According to various, but not necessarily all, examples of the invention there may be provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

FIGS. 1 to 4 illustrate an apparatus 1 comprising: processing circuitry 5; and memory circuitry 7 including computer program code 11; the memory circuitry 7 and the computer program code 11 configured to, with the processing circuitry 5, cause the apparatus 1 at least to perform: obtaining information from a plurality sensors 27 wherein the plurality of sensors 27 are located on a plurality of vehicles 35; analysing the obtained information to determine whether at least one vehicle 35 is exposed to risk; and if it is determined that at least one vehicle 35 is exposed to risk, enabling one or more of the plurality of vehicles 35 to activate a defensive mode of operation wherein the defensive mode of operation comprises autonomously controlling at least one vehicle 35 to move away from the risk.

Examples of the disclosure provide a system for enabling one or more vehicles to activate a defensive mode of operation. This may be used to protect a vehicle from criminal or accidental damage or other situations.

Figure 1:
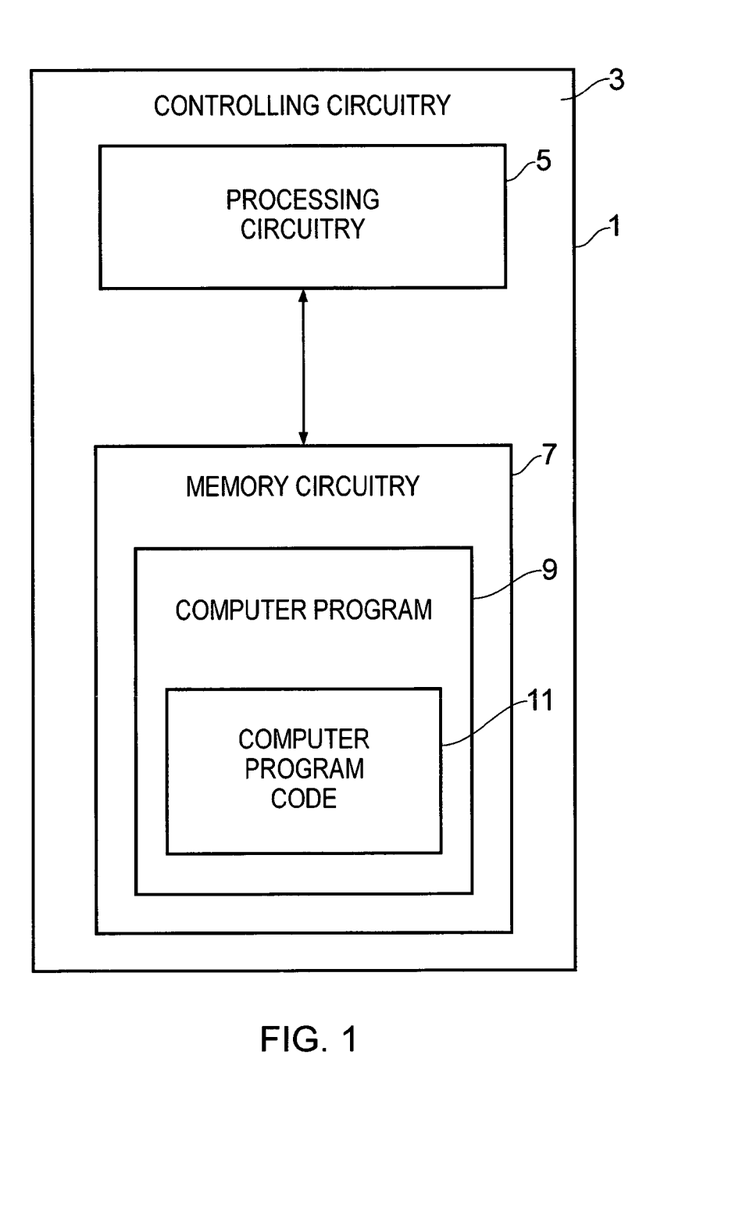
FIG. 1 illustrates an apparatus.

FIG. 1 schematically illustrates an example apparatus 1 which may be used in implementations of the disclosure. The apparatus 1 illustrated in FIG. 1 may be a chip or a chip-set. The apparatus 1 may be provided within a device such as a server which may be configured to communicate with a vehicle. In some examples the apparatus 1 may be provided within the vehicle itself.

The example apparatus 1 comprises controlling circuitry 3. The controlling circuitry 3 may provide means for enabling autonomous control of a vehicle. The autonomous control of a vehicle may be location based. The autonomous control of the vehicle may enable the vehicle to be driven and/or parked without direct control inputs from a user. The controlling circuitry 3 may comprise one or more controllers. The controlling circuitry 3 may be implemented using instructions that enable hardware functionality, for example, by using executable computer program instructions in a general-purpose or special-purpose processing circuitry 5 that may be stored on a computer readable storage medium (disk, memory etc) to be executed by such processing circuitry 5.

The processing circuitry 5 may be configured to read from and write to memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5. The computer program instructions, of the computer program 9, provide the logic and routines that enables the apparatus 1 to perform the example methods illustrated in FIGS. 5 and 6. The processing circuitry 5 by reading the memory circuitry 7 is able to load and execute the computer program 9.

The apparatus 1 therefore comprises: processing circuitry 5; and memory circuitry 7 including computer program code 11; the memory circuitry 7 and the computer program code 11 configured to, with the processing circuitry 5, cause the apparatus 1 at least to perform: obtaining information from a plurality sensors 27 wherein the plurality of sensors 27 are located on a plurality of vehicles 35; analysing the obtained information to determine whether at least one vehicle 35 is exposed to risk; and if it is determined that at least one vehicle 35 is exposed to risk, enabling one or more of the plurality of vehicles 35 to activate a defensive mode of operation wherein the defensive mode of operation comprises autonomously controlling at least one vehicle 35 to move away from the risk.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program 9. The apparatus may propagate or transmit the computer program 9 as a computer data signal.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:

(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 2:
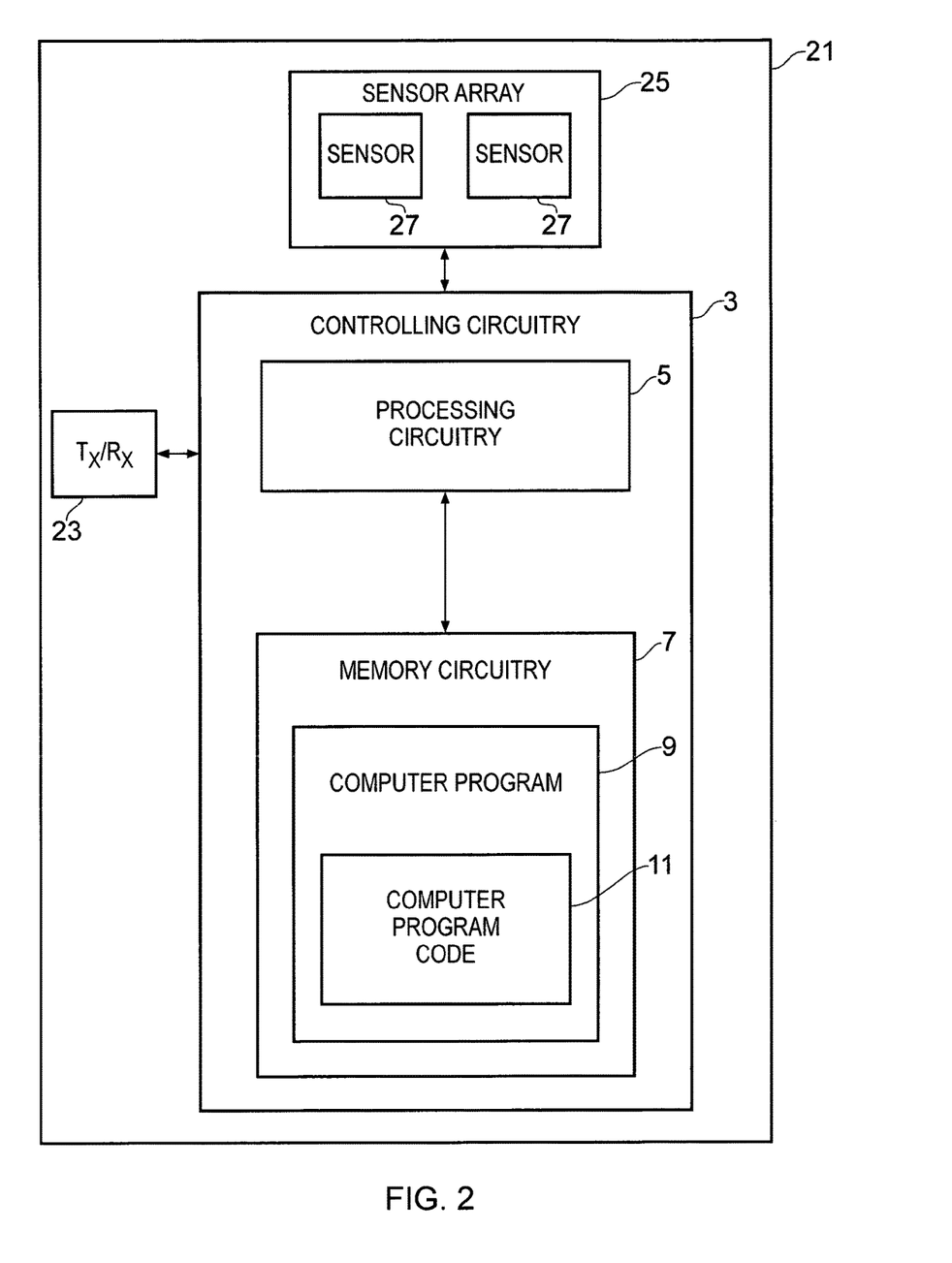
FIG. 2 illustrates a server comprising an apparatus.

FIG. 2 schematically illustrates another example apparatus 21. The apparatus 21 of FIG. 2 may comprise controlling circuitry 3 a transceiver 23 and a sensor array 25. It is to be appreciated that only features necessary for the following description have been illustrated in FIG. 2. Other examples may comprise additional features such as a user interface to enable a user to control the apparatus 1.

The controlling circuitry 3 of FIG. 2 may be as illustrated in FIG. 1 and described above. Corresponding reference numerals are used for corresponding features.

The transceiver 23 may comprise one or more transmitters and/or receivers. The transceiver 23 may comprise any means which enables the apparatus 21 to establish a communication connection with a remote device and exchange information with the remote device. The communication connection may comprise a wireless connection.

In some examples the transceiver 23 may enable the apparatus 1 to connect to a network. The network may comprise a cellular or non-cellular network. In some examples the transceiver 23 may enable the apparatus 1 to communicate in local area networks such as wireless local area networks, Bluetooth networks or any other suitable network.

The sensor array 25 may comprise a plurality of sensors 27. The plurality of sensors 27 may comprise any means which may be configured to detect a physical parameter and provide an electrical signal indicative of the physical parameter. This may enable information about the environment of the vehicle to be obtained. The plurality of sensors 27 may also enable information about the activities of people in the area of the vehicle to be obtained.

The plurality of sensors 27 may comprise a plurality of different types of sensors which may be configured to detect different physical parameters. The physical parameters could comprise the distance between the vehicle and other objects, the location of the vehicle, the temperature around the vehicle, a change in the temperature around the vehicle, the presence of smoke or other chemicals in the air around the vehicle, noises around the vehicle or any other suitable physical parameter.

The sensor array 25 may comprise one or more sensors 27 which may be located within the apparatus 21 itself. For example the sensor array 25 may comprise global positioning system (GPS) sensors which may detect the position of the vehicle or motion sensors such as accelerometers which may detect movement of the vehicle such as accelerations, vibrations or tilting.

In some examples the sensor array 25 may also comprise one or more sensors 27 which may be located external to the apparatus 21. The external sensors 27 may be configured to provide the electrical signals indicative of the sensed parameters to the apparatus 21. In some examples the external sensors 27 may be configured to provide the electrical signals indicative of the sensed parameters to the apparatus 21 via the transceiver 23. For example proximity sensors may be provided on the outside of a vehicle and may be configured to detect when an object is close to the vehicle. This information could then be transmitted to the apparatus 21 which may be located inside the vehicle.

In some examples the plurality of sensors 27 may be located on a plurality of vehicles. The plurality of vehicles may be located in proximity to each other. The information obtained from the plurality of sensors 27 on the plurality of vehicles may enable the activity of people or other objects to be monitored. The people who could be monitored may be pedestrians passing the plurality of vehicles.

In some examples the plurality of sensors 27 may comprise audio sensors such as microphones. The microphones may be configured to detect noises such as a window or mirror being broken or noises created by large groups of people or any other type of noises.

In some examples the plurality of sensors 27 may comprise one or more pressure sensors. The one or more pressure sensors may be configured to detect events such as a window being broken in a vehicle or other objects touching the vehicle.

In some examples the plurality of sensors 27 may comprise image sensors such as a camera or a video camera. The image sensors may enable image recognition of objects close to the vehicle.

In some examples the plurality of sensors 27 may comprise sensors which may be configured to detect when a user touches or moves part of the vehicle. For example the sensors 27 may be configured to detect if a person touches the door handle or if they move the windscreen wipers or if a door is opened or any other suitable event occurs.

The sensor array 25 may be configured to provide the information obtained from the sensors 27 to the controlling circuitry 3. The controlling circuitry 3 may store the obtained information in the memory circuitry 7 and/or use the information to enable autonomous control of a vehicle. In some examples of the disclosure the controlling circuitry 3 may analyse the obtained information to enable an emergency. The information obtained from the plurality of sensors 27 may be analysed to determine whether at least one vehicle is exposed to risk. In some examples the information obtained from the plurality of sensors 27 may be analysed to define a category of risk which at least one vehicle is exposed to.

Figure 3:
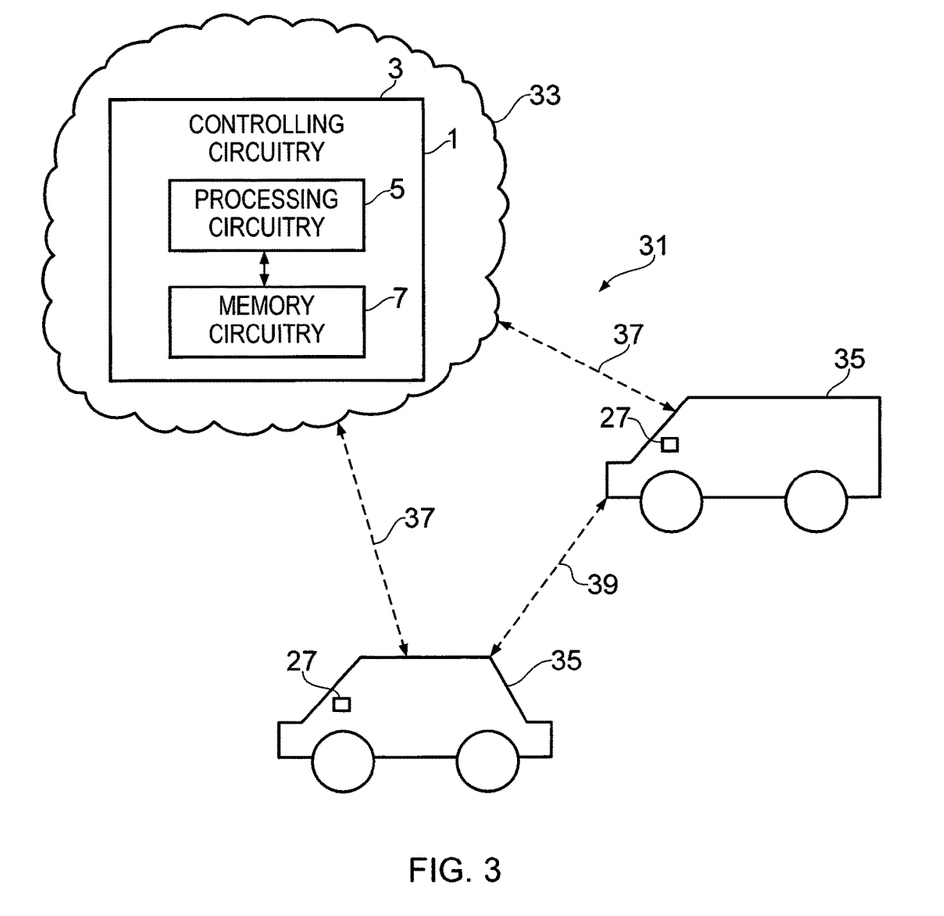
FIG. 3 illustrates a system comprising an apparatus.

FIG. 3 illustrates an example system 31 comprising an apparatus 1 according to an example of the disclosure. The example system 31 comprises a server 33 and a plurality of vehicles 35.

In the example of FIG. 3 two vehicles 35 are illustrated. It is to be appreciated that any number of vehicles 35 may form part of the system 31 in other examples of the disclosure. The plurality of vehicles 35 may be located close to each other. For example the plurality of vehicles 35 may be located within the same car park or street or within a predetermined range of each other.

The server 33 may comprise an apparatus 1 as described above in relation to FIG. 1. The server 33 may be located remotely from the plurality of vehicles 35. The server 33 may be located within a communications network which may be accessed by the one or more vehicles 35.

The server 33 may be configured to establish one or more communication links 37 with the plurality of vehicles 35. The communication links 37 may comprise wireless communication links. The wireless communication links may be part of a communications network such as cellular communications network or a local area network.

The communication links 37 may comprise any means which may enable information to be exchanged between the apparatus 1 in the server 33 and the plurality of vehicles 35. The information which is exchanged may comprise information which is obtained by the plurality of sensors 27. For example, the plurality of vehicles 35 may comprise sensors 27 which may be configured to obtain information about the environment of the plurality of vehicles 35. This information could be provided to the apparatus 1 via the communication links 37.

In some examples the information which is exchanged may comprise information which enables the plurality of vehicles 35 to activate a defensive mode of operation. For example the apparatus 1 may be configured to analyse the information obtained from the plurality of vehicles 35 and in response to the analysis provide a control signal to the plurality of vehicles 35 which may enable the plurality of vehicles 35 to activate a defensive mode of operation.

The vehicles 35 may comprise a plurality of sensors 27. In some examples each of the plurality of vehicles 35 may comprise one or more sensors 27.

The plurality of sensors 27 may comprise any means which may be configured to sense a parameter which may be used to determine whether at least one vehicle 35 is exposed to risk. The plurality of sensors 27 may comprise proximity sensors, GPS sensors, heat detectors, infra red sensors, smoke detectors, audio detectors, image sensors, pressure sensors or any other suitable type of sensor 27.

The plurality of sensors 27 may be configured to provide the information obtained by the sensors 27 to the apparatus 1 via the communication link 37. In some examples the vehicles 35 may comprise processing circuitry so the signals received from the sensor 27 may be pre-processed before the information is sent to the apparatus 1.

In the example system 31 of FIG. 3 the vehicles 35 are also configured to enable a communication link 39 to be established between two or more vehicles 35. For example each of the vehicles 35 may comprise a transceiver and processing circuitry. The communication link 39 may comprise any means which may enable information to be exchanged between the two or more vehicles 35. The communication link 39 may comprise a wireless communication link. The communication link 39 may be part of a network such as a local area network. The communication link 39 may enable the plurality of vehicles 35 to coordinate a defensive mode of operation.

Figure 4:
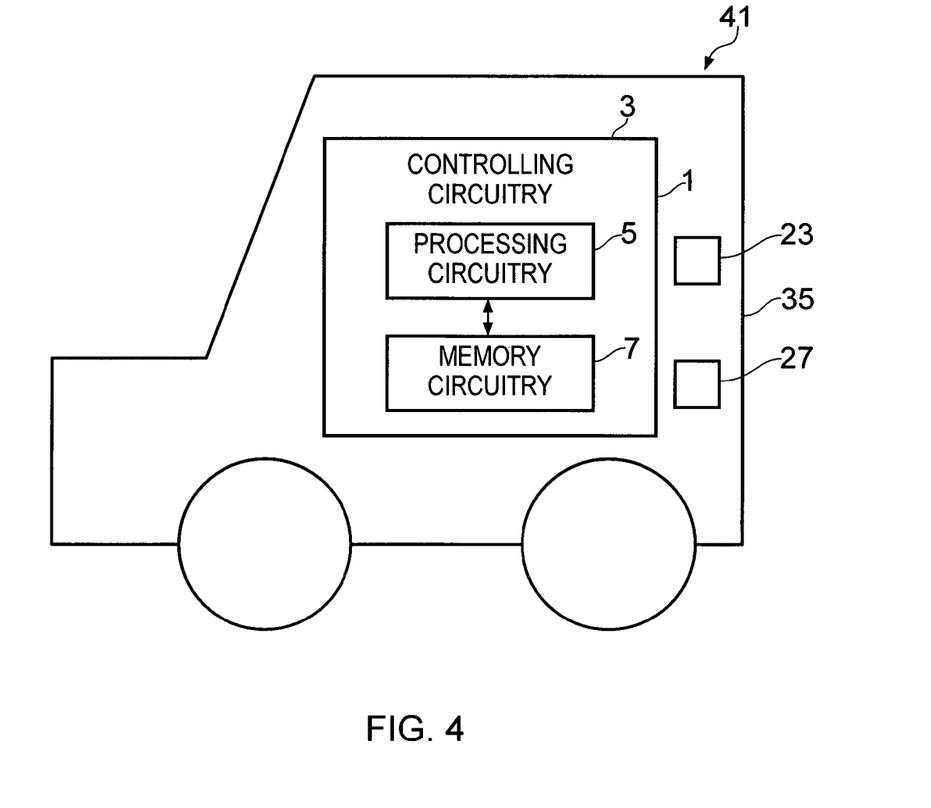
FIG. 4 illustrates a vehicle comprising an apparatus

FIG. 4 illustrates another system 41 according to another example of the disclosure. The system 41 comprises an apparatus 1 as described above in relation to FIG. 1 and a vehicle 35. In the example system 41 of FIG. 4 the apparatus 1 is located within the vehicle 35. The apparatus 1 may be configured to enable autonomous control of the vehicle 35. The apparatus 1 may be configured to determine if one or more vehicles 35 are at risk and activate a defensive mode of operation.

The vehicle 35 may comprise a plurality of sensors 27. As described above the plurality of sensors 27 may comprise any means which may be configured to sense a parameter which may be used to determine whether at least one vehicle 35 is exposed to risk. The plurality of sensors 27 may comprises proximity sensors, GPS sensors, heat detectors, infra red sensors, smoke detectors, audio detectors, image sensors, pressure sensors or any other suitable type of sensor 27.

The sensors 27 may be configured to provide the information obtained by the sensors 27 to the apparatus 1. In some examples the sensors 27 may be located within the apparatus 1, for example the sensor 27 may comprise a GPS sensor or an accelerometer. In other examples the sensor 27 may be external to the apparatus 1. For example the apparatus 1 may be located inside the vehicle 35 while sensors 27 such as proximity sensors, heat detectors or pressure sensors may be located on the outside of the vehicle 35. In such examples the apparatus 1 may comprise means for enabling the information obtained by the sensors 27 to be provided to the apparatus 1.

In some examples the vehicle 35 may comprise a transceiver 23. The transceiver 23 may comprise any means which enables the apparatus 21 to establish a communication connection with other vehicles 35 and exchange information with the other vehicles 35. For example the transceiver 23 may enable the information obtained from the sensors 27 to be exchanged with other vehicles 35. The communication connection may comprise a wireless connection.

It is to be appreciated that other example systems may be implemented in which the processing circuitry 5 and memory circuitry 7 is distributed between apparatus 1 located within the plurality of vehicles 35 and apparatus 1 located within a communications network which is accessible by the plurality of vehicles 35.

Figure 5:
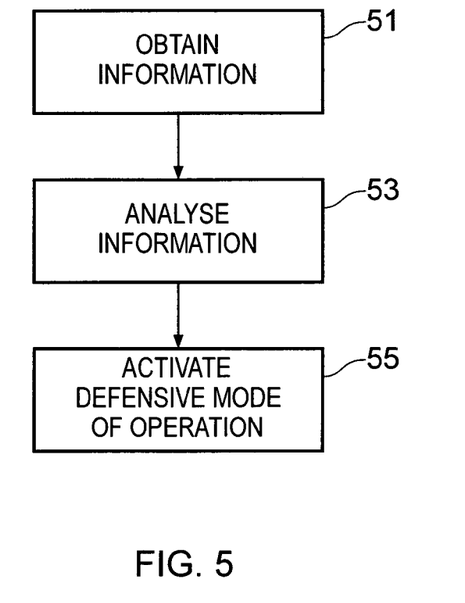
FIG. 5 illustrates a method.
Figure 6:
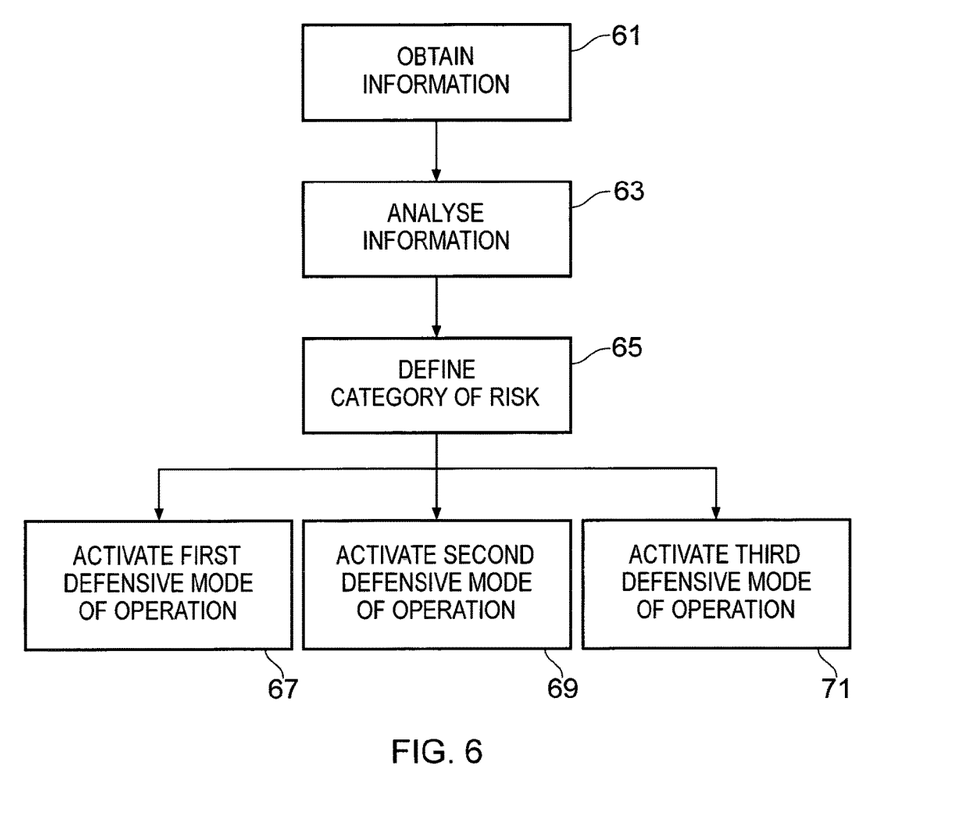
FIG. 6 illustrates a method.

FIGS. 5 and 6 are block diagrams which schematically illustrate example methods. The methods of FIGS. 5 and 6 may be implemented using the apparatus 1, 21 and systems 31, 41 as described above in relation to FIGS. 1 to 4.

FIG. 5 illustrates a method according to a first example method. The method comprises at block 51 obtaining information from a plurality of sensors 27 where the plurality of sensors 27 are located on a plurality of vehicles 35.

At block 53 the method comprises analysing the obtained information to determine whether at least one vehicle 35 is exposed to risk.

If at block 53 it is determined that at least one vehicle 35 is exposed to risk then, at block 55 the method comprises enabling one or more of the plurality of vehicles 35 to activate a defensive mode of operation wherein the defensive mode of operation comprises autonomously controlling at least one vehicle to move away from the risk.

The defensive mode of operation may comprise any functions which may be performed by the vehicle 35 and which may enable the vehicle and/or a user of the vehicle to be protected.

FIG. 6 illustrates another example method according to examples of the disclosure.

At block 61 information is obtained by an apparatus 1 from a plurality of sensors 27. The plurality of sensors 27 may be located on a plurality of vehicles 35. The information which is obtained from the sensors 27 may be transmitted to the apparatus 1 via one or more transceivers 23.

The information which is obtained may comprise a plurality of different types of information which may be obtained from a plurality of different sensors 27. For example it may comprise audio information obtained from audio detectors as well as visual information obtained from image sensors or any other type of information obtained from other types of sensors 27.

The information which is obtained may comprise information obtained from a plurality of different vehicles 35. This may enable more information to be collected than could be collected from a single vehicle. This may enable patterns of behaviour or activity to be recognised more efficiently.

At block 63 the apparatus 1 analyses the information which is obtained from the sensors 27. The apparatus 1 may analyse the information to determine whether or not at least one vehicle 35 is exposed to risk.

In some examples at least one vehicle 35 may be determined to be exposed to risk if the information obtained from the plurality of vehicles 35 comprises a predetermined pattern. For instance the apparatus 1 may compare the information obtained with predetermined patterns which would be expected in a situation in which one or more vehicles 35 may be exposed to risk. If there is a correlation between the information and a predetermined pattern then it may be determined that one or more the vehicles 35 is at risk.

In some examples at least one vehicle 35 may be determined to be at risk if information obtained from the plurality of sensors 27 is above a threshold. For instance if the plurality for sensors 27 comprise audio sensors then one or more vehicles 35 may be determined to be exposed to risk if the output of the audio sensors is above a threshold. This may enable certain noises to be detected, such as the breaking of glass or the noise of a large crowd of people.

At block 65 the information obtained from the sensors 27 is analysed to determine whether or not one or more vehicles 35 are at risk. The vehicles 35 which are at risk may be vehicles 35 which have provided information to the apparatus 1. In some examples the vehicles 35 which are at risk may comprise vehicles 35 which are located close to the vehicles 35 which have provided information to the apparatus 1.

At block 65 the information is analysed to define a category of risk which at least one vehicle 35 is exposed to. The categories of risk may relate to different types of risk. For example, one category of risk could be that activity that has damaged a vehicle 35 has occurred and another could be that there is a large crowd of people near the vehicle 35 such as a protest or a crowd of people exiting a sports or entertainment arena and another could be that there has been an attempt at damage to a vehicle 35. It is to be appreciated that other categories of risk may be detected in other examples of the disclosure.

At blocks 67 to 71 the defensive modes of operation are activated. The defensive mode of operation may comprise any functions which may be performed by the vehicle 35 and which may enable the vehicle and/or a user of the vehicle to be protected. The defensive mode of operation may comprise triggering an action which is controlled by a vehicle 35. For example, it may comprise closing a sunroof of a convertible car, closing windows of a vehicle 35, triggering a horn or lights or any other suitable function.

The defensive mode of operation which is activated, and the functions which are performed, may depend on the category of risk that has been defined at block 65.

If at block 65 a first category of risk is defined then, at block 67, the first defensive mode of operation is activated.

In the example method of FIG. 6 the first category of risk may comprise activity that has damaged a vehicle 35. For example, the information obtained from the plurality of sensors 27 may indicate that one or more windows have been broken or that a door has been forced open or that any other type of damage has been made to one or more vehicles 35.

In such examples the first defensive mode of operation may prevent further damage to the vehicle 35 which has already been damaged. For example it may activate an alarm or cause headlights to flash or send a message to the owner of the vehicle 35.

The first defensive mode of operation may also enable functions which prevent damage occurring to other vehicles 35 which may be close to the damaged vehicle 35. For example it may enable a warning message to be transmitted to other vehicles 35 which may be located close to the damaged vehicle 35. The warning message may cause the other vehicles to activate its own sensors 27, which may include image sensors, so that the other vehicles 35 may monitor the activity of people located close to the vehicle 35. In some examples the warning message may cause the other vehicles 35 to sound an alarm or flash headlights to warn off people who may cause damage to the vehicle 35.

Activating the first defensive mode of operation may also enable a message to be sent to an owner of the vehicle 35 which may allow them to check their vehicle 35. In some examples a message may also be sent to the police. In some examples a message may also be sent to other security personnel. For example if the vehicle 35 is parked in car park a message may be sent to a car park attendant.

In some examples the vehicles 35 may be configured for autonomous control which may enable the vehicles 35 to be moved away from the risk. In some examples the vehicles 35 could be driven as far as is necessary to remove the vehicles 35 from the potential risk. In other examples the vehicles 35 may be moved a small distance such as few meters to deter a person from damaging the vehicles 35. In some examples the defensive mode of operation may also comprise autonomously controlling at least one vehicle 35 to move back to its original location if the risk or potential risk is removed. This may enable vehicles 35 to be automatically returned to their original position.

In some examples the defensive mode of operation may enable access to contacts of the user of the vehicle 35. If it is determined that the vehicle 35 is exposed to risk then a message may be sent to a contact that is currently located closest to the vehicle 35. This may ensure that a person could respond to the message quickly even if the user of the vehicle 35 is not close by.

In some examples activating the first defensive mode of operation may enable tracking of the person or object that has caused damage to a vehicle 35. For example if a person has broken a window of a vehicle 35 then a camera or other image sensor may be used to capture an image of the person. This information could then be provided to a plurality of other vehicles 35. The plurality of other vehicles 35 could then use image recognition to track the person which may enable the person to be reported to the police.

As the person or object that caused damage to the vehicle is tracked warning messages could be sent to other vehicles located in the direction in which the person or object is heading. The warning message may enable the other vehicles 35 to activate sensors 27 to enable tracking of the person or object.

In some examples the warning message may enable a vehicle 35 to activate video recording or image recording. This may also enable the vehicle 35 to play an audio message indicating than images and/or video is being captured. The audio message may be played if it is detected that a person is close to the vehicle 35. This may deter a person from causing damage to the vehicle 35 or other nearby vehicle 35.

As mentioned above, in some examples the tracking information obtained by one or more vehicles 35 may be shared with security services such as the police. The information may be shared instantaneously so as to enable real time tracking of the person or object. This may enable the police or other security services to track a person to their home.

In some examples the plurality of vehicles 35 may each capture images of the person who has caused damage to a vehicle 35. This enables more image information to be obtained. Increasing the number of images that are captured makes it more likely that an image in which the person is recognisable may be captured. Also as the plurality of vehicles are in different positions the images of the person may be captured from different directions. For instance, the first vehicle 35 may capture an image in which the person's face is hidden, however a different vehicle 35 may capture an image of the person from a different angle and so may be able to capture an image of the person's face.

In some examples the images which are captured may be shared with the police or other security services but might not be provided to the user's of the vehicles 35. This may prevent owners of the vehicles 35 blaming the wrong person, if more than one person is captured in the image then the owner of the vehicle 35 might not know which person is the one who was being tracked. Also this may prevent the owners of the vehicles 35 attempting vigilante actions which could be dangerous. In some examples the images may be protected by a password or otherwise encrypted so that only authorised personnel can access the images 35.

In some examples when the vehicle 35 detects an event it may scan for nearby wireless devices. The nearby wireless devices may be used to identify any person or people who have caused damage to any vehicle 35. For instance if the movement of a mobile device belonging to a person matches the movement of the person identified using facial recognition then this provides a high level of confidence to the security services that they have tracked the right person.

If at block 65 a second category of risk is defined then, at block 69, the second defensive mode of operation is activated.

In the example method of FIG. 6 the second category of risk may comprise a large crowd of people near the vehicle 35 such as a protest or a crowd of people exiting a sports or entertainment arena. In such examples the information which has been obtained from the sensors 27 may comprise audio inputs which correspond to a large group of people or images obtained from the image sensors which correspond to a large group of people or any other information which may be obtained from the sensors 27.

The second defensive mode of operation may comprise functions which prevent damage occurring to the vehicle 35. For example it may activate an alarm or cause headlights to flash which may deter people in the crowd from touching the vehicle 35.

The second defensive mode of operation may also enable other vehicles 35 in the vicinity of the crowd to flash headlights or sound alarms. The other vehicles 35 may comprise vehicles 35 which have provided information from one or more sensors 27. In some examples the vehicles 35 may also comprise vehicles 35 which have not provided any information from sensors 27 but which are located close to vehicles 35 which have.

Activating the second defensive mode of operation may also enable a message may be sent to an owner of the vehicle 35 which may allow them to check their vehicle 35. In some examples the message may warn the user of the vehicle 35 that there is a large crowd near the vehicle 35. This may warn the user from returning to the vehicle 35 until the crowd has passed.

In some examples activating the second defensive mode of operation may enable tracking of the crowd of people. For instance the image and/or audio sensors 35 may enable the movement of the crowd of people to be monitored. This information may be passed to other vehicles 35 which are located in the direction in which the crowd is heading. This may enable the other vehicles 35 to activate a defensive mode of operation before the crowd arrives.

If at block 65 a third category of risk is defined then, at block 71, the third defensive mode of operation is activated.

In the example method of FIG. 6 the third category of risk may comprise an attempt at damage to a vehicle 35. For example, the information obtained from sensors 27 such as pressure sensors 27 may indicate that excessive force has been applied to parts of the vehicle 35. This could indicate that a person has been trying to break a window.

In other examples the information may be that a person has tried to use the door handle of a plurality of vehicles 35. For instance if a first vehicle 35 detects that a person has lifted a door handle of a vehicle 35 this may be recognised as a user checking that the door is locked correctly. If a plurality of vehicles 35 within a predetermined range of each other each detects that a person has tried to use the door handle then this may be detected to be the activity of a person who may be looking to steal or cause damage to a vehicle 35.

In such examples the third defensive mode of operation may prevent damage being caused to the vehicles 35. For example it may activate an alarm or cause headlights to flash or send a message to the owners of the vehicles 35.

Activating the third defensive mode of operation may also enable a message to be sent to an owner of the vehicle 35 which may allow them to check their vehicle 35. In some examples the vehicle 35 may be configured for autonomous control which may enable the vehicle 35 to be moved away from the risk.

In some examples activating the third defensive mode of operation may enable tracking of the person or object that has attempted to cause damage to the vehicles 35. For example if a person has tried to break a window of a vehicle 35 then a camera or other image sensor may be used to capture an image of the person. This information could then be provided to a plurality of other vehicles 35. The plurality of other vehicles 35 could then use image recognition to track the person which may enable them to be reported to the police.

It is to be appreciated that only a limited number of examples have been described above and that other situations may be detected in other examples. The defensive mode of operation may comprise any suitable functions which protect the vehicle 35 and/or the user of the vehicle 35.

In some examples the defensive mode of operation may be activated once a pattern of behaviour has been established. For example if a first vehicle 35 detects a person touching a vehicle 35, for example, a person trying a door handle, then the first vehicle 35 might not activate a defensive mode immediately. This would prevent unnecessary alarms being activated. An unnecessary alarm may be a nuisance for people near the vehicle 35 and the user of the vehicle. However the movement of the person who touched the vehicle 35 may be monitored. If the person moves towards a second vehicle 35 then the sensors 27 of the second vehicle 35 may be activated. For instance, an image sensor 27 may be activated to enable images of the person to be captured. If the person tries the door handle of the second vehicle 35 then an alarm still might not be sounded so as to reduce nuisance alarms. However a warning message may be sent to other vehicles 35 in the location that potentially suspicious behaviour has been detected. In some examples a warning message may be sent to vehicles 35 in locations which a cause of potentially suspicious behaviour is moving towards. The movement of the person who has tried the door handles may be monitored to predict the direction in which they are travelling. If the person goes to a third vehicle 35 and tries another door handle then the third vehicle 35 may activate a defensive mode and sound an alarm as this may be recognised as a pattern of suspicious behaviour.

In some examples the third vehicle 35 may send messages to other vehicles 35 to enable multiple vehicles 35 to provide a synchronised response. For example, the third vehicle 35 may send messages to the first and second vehicles to enable all three vehicles 35 to activate a defensive mode of operation. The defensive mode of operation could be an alarm sounding or lights flashing or any other type of function. This could provide an indication to the person that their behaviour has been monitored and may prevent them from attempting any further potentially damaging activities.

In some examples the third vehicle 35 may send messages to all vehicles 35 within a given area to enable all of the vehicles 35 to provide a synchronised response. This may act as a strong deterrent to any further potentially damaging activities as it would show the person that their behaviour is being monitored from multiple vehicles 35.

In some examples the defensive mode of operation may enable the vehicle 35 to connect to other devices and cause other devices to be activated as needed. For example it may allow messages to be sent to a controller of street lighting to enable street lighting to be activated or cause to flash which may provide a deterrent to a person looking to damage vehicles. In some examples it may allow messages to be sent to controllers of security cameras which may enable a person to be tracked more efficiently.

In the above described examples the cause of the potential damage to vehicles 35 was a person or people. It is to be appreciated that in other examples the source of potential damage could be an object such a moving vehicle. For example a street cleaning vehicle may comprise brushes which may unintentionally sweep grit and stones towards parked vehicles 35 as it passes by. Similarly, in cold conditions trucks may be used to spread sand and/or salt on the roads which may unintentionally cause damage to parked vehicles 35. In such situations if one or more vehicles 35 detect that they have been hit by small projectiles then a warning message may be sent to other parked vehicles 35. In response to the warning message the other vehicles 35 may move out of the way to avoid being hit by any projectiles.

FIGS. 7A to 8C show example systems 31 in which a plurality of vehicles 35 may activate a defensive mode of operation when a street cleaning vehicle 71 is detected near the plurality of vehicles 35.

Figure 7A:
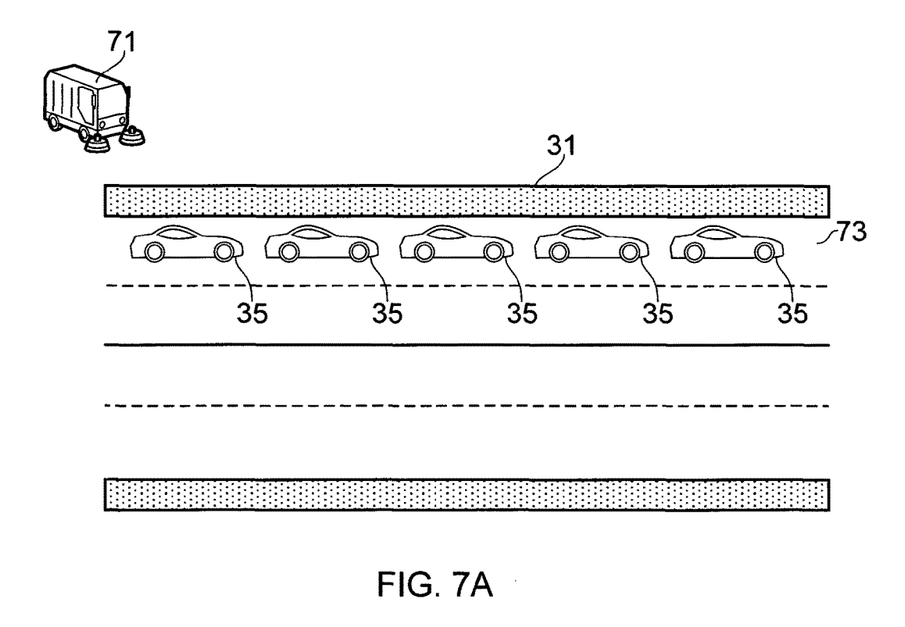
FIGS. 7A and 7B illustrate a method.

In the example of FIG. 7A a plurality of vehicles 35 are parked on the side of a street 73. The vehicles 35 may be parked so that they are positioned adjacent to the edge of the street 71.

In FIG. 7A a street cleaning vehicle 71 is approaching the plurality of parked vehicles 35. The vehicles 35 may obtain information which indicates that the street cleaning vehicle 71 is approaching the plurality of vehicles 35. For instance proximity sensors may sense that the street cleaning vehicle is within a predetermined distance, audio sensors may detect the sound of the street cleaning vehicle 71, one or more of the plurality of parked vehicles 35 may obtain information about the schedule of street cleaning in the street in which the vehicles 35 are parked or any other suitable method of obtaining information. In some examples the street cleaning vehicle 71 may transmit a message to the plurality of vehicles 35 indicating that it is close by.

When the street cleaning vehicle 71 is detected it may be determined that the plurality of vehicles 35 are at risk of being damaged. For example, it may be determined that the grit or stones from the brushes of the street cleaning vehicle 71 may damage the parked vehicles 35. In such examples it may be beneficial for the vehicles 35 to move out of the path of the street cleaning vehicle 71. Also the plurality of parked vehicles 35 may prevent the street cleaning vehicle 71 from cleaning the edge of the street 73. This may place the owners of the vehicles 35 at risk of obtaining a fine or penalty notice for preventing the street 73 from being cleaned.

Figure 7B:
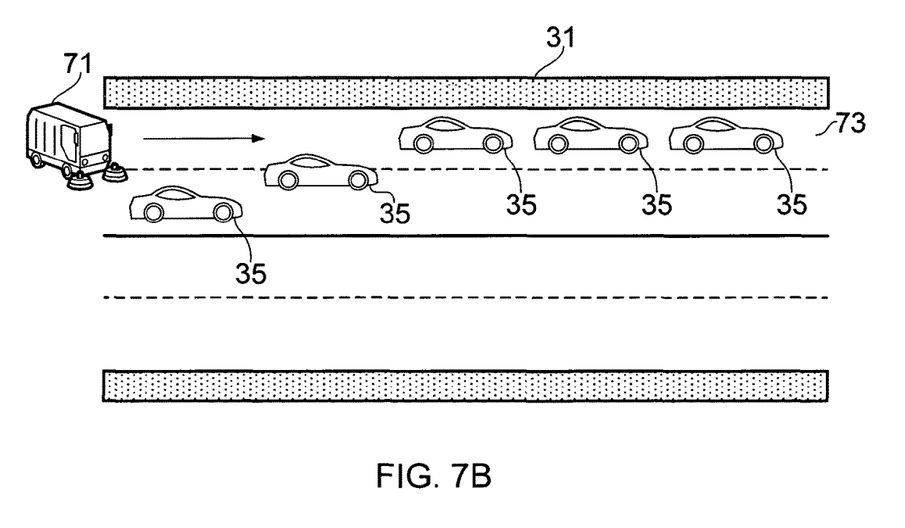

In response to determining that there is a potential risk to the owner the vehicles 35 activate a defensive mode of operation. In the defensive mode of operation the vehicles 35 may be autonomously controlled to move out of the path of the street cleaning vehicle 71. FIG. 7B shows the plurality of vehicles 35 after the defensive mode of operation has been activated. In this defensive mode of operation the vehicles 35 move sequentially so that initially only the first vehicle 35 moves out of the path of the street cleaning vehicle 71. When the street cleaning vehicle 71 moves further forward the next vehicle 35 in the line of parked vehicles 35 may be controlled to move out of the path of the street cleaning vehicle 35.

The vehicles 35 may move away from the edge of the street 73. The vehicles 35 may move far enough away from the edge of the street so that there is enough room for the street cleaning vehicle 71 to pass between the vehicle 35 and the edge of the street. In some examples the vehicle 35 may move far enough away from the edge of the street so that it is not damaged by grit or dirt as the street cleaning vehicle 35 passes by.

Once the street cleaning vehicle 71 has finished cleaning the street 73 the vehicles 35 may return to their original positions. This may enable the vehicle 35 to return to the position it was previously parked in. This may enable the user to find their vehicle as it will be parked in the position they left it.

Figure 8A:
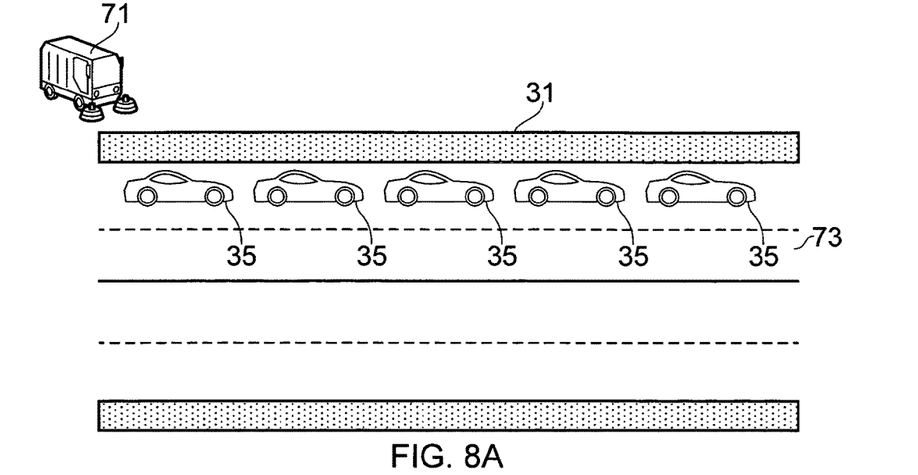
FIGS. 8A to 8C illustrate a method.
Figure 8B:
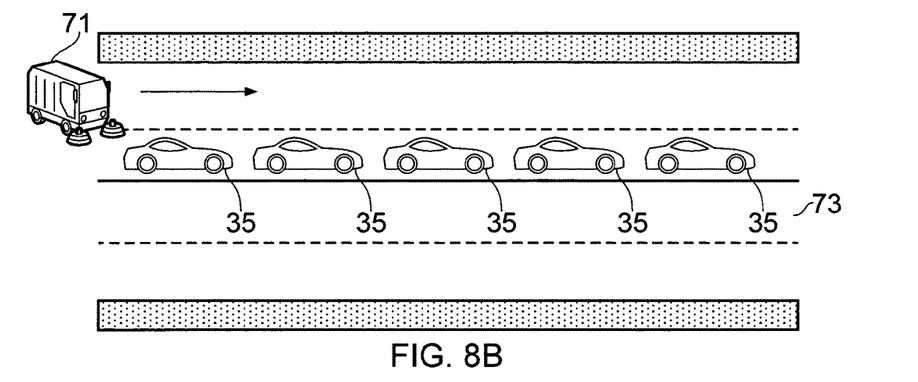
Figure 8C:
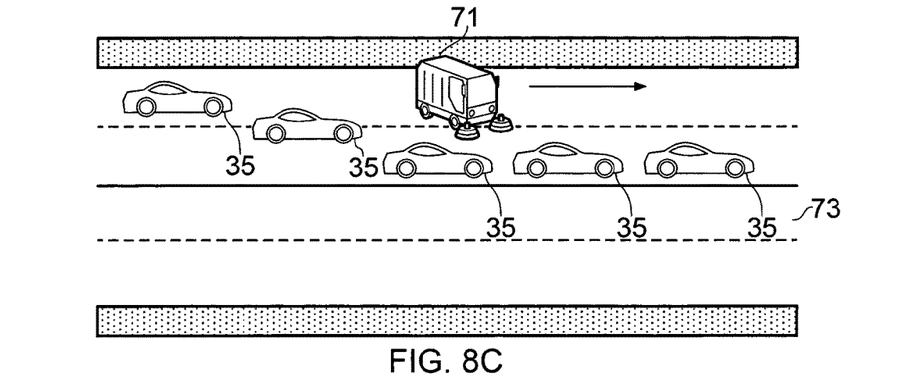

FIGS. 8A to 8C illustrate another example in which a plurality of vehicles 35 move out of the path of a street cleaning vehicle 71. In the example of FIG. 8A a plurality of vehicles 35 are parked in the street 73 as described above with reference to FIG. 7A.

In FIG. 8B, after the street cleaning vehicle 71 has been detected the plurality of vehicles 35 are autonomously controlled to move out of the path of the street cleaning vehicle 71. FIG. 8B shows the plurality of vehicles 35 after the vehicles 35 have been moved. In this example the vehicles 35 move simultaneously so that initially all of the vehicles 35 on the street 73 out of the path of the street cleaning vehicle 71 at the same time.

Once the street cleaning vehicle 71 has finished cleaning the edge of the street next to a vehicle 35 the vehicle 35 may return to its original position. FIG. 8C illustrates an example in which the vehicles 35 move back to their original parked position after the street cleaning vehicle 71 has passed.

In some examples the vehicles 35 may move back to the parked position if it is detected that the street cleaning vehicle 71 has passed or has finished cleaning. In some examples the vehicles 35 may move back to the parked position after a predetermined time, for example twenty minutes, has elapsed.

In the examples of FIGS. 7A to 8C the vehicles 35 are only moved a few meters to another position within the same street. In other examples the vehicles 35 could be moved further. For instance, in some examples the street cleaning vehicle 71 may have access to map information and may use the map information to direct the vehicles 35 to parking locations in another area.

In some examples the area in which the plurality of vehicles 35 are parked may be designated a "street cleaning area". Information may be provided to the owners of the vehicles 35 indicating that their vehicle 35 is parked in a designated "street cleaning area". In some examples the vehicles 35 may be moved to any position within the street cleaning area to ensure that the vehicle 35 is not obstructing a street cleaning vehicle 71. In some examples the vehicle 35 may be moved a predetermined distance within the street cleaning area to ensure that the vehicle 35 is not obstructing a street cleaning vehicle 71. The positions of the plurality of vehicles 35 within the street cleaning area may be controlled by a server. The server could be remote to the plurality of vehicles or could be located in the street cleaning vehicle or any other suitable location. In some examples the server may be configured so that a user, such as the driver of a street cleaning vehicle 71, can make user inputs to control the positions of vehicles 35 within the street cleaning area.

In some examples the positions that the vehicle 35 is moved to may depend on a plurality of factors. These could include parameters such as current traffic levels, the number of vehicles that need to be moved, whether a passenger is in a vehicle 35 of any other suitable parameter.

In some examples the vehicles 35 may be returned to the positions in which they were originally parked. In other examples the vehicles 35 may be rearranged so that the positions of the plurality of vehicles 35 may be optimized. This may enable additional spaces to be made available for other vehicles 35.

In some examples the systems 31, 41 described above may be used to detect interaction with vehicles 35 which might not be causing damage to a vehicle 35. For example if it is detected that the windscreen wipers of a vehicle 35 have been moved and an object has been left underneath the windscreen wipers then the object is likely to be either a parking ticket left by a traffic warden or a flyer or other leaflet left by a member of the public. If information is obtained from a plurality of vehicles 35 then the apparatus 1 may be able to distinguish between the parking tickets and the leaflets. For example a parking ticket is likely to be left on only a small number of vehicles 35 in a given area while a leaflet is likely to be left on all vehicles 35. Also a traffic warden is likely to pause between leaving tickets on vehicles 35 as they need to check the vehicle 35 and fill in a parking ticket whereas a member of the public would not need as much time between leaving leaflets. In such examples if it is determined that a vehicle 35 is at risk of obtaining a parking ticket a message may be sent to the user of the vehicle 35. This may enable the user of the vehicle 35 to return to the vehicle 35 before their parking time runs out. In some examples a user of a vehicle 35 might not like receiving junk mail and so might object to having leaflets left on the vehicle 35. In such examples the vehicle 35 may be configured to provide a recorded or visual message asking that no flyers are left on the vehicle 35.

In some examples image recognition or other types of sensors 27 may be used to differentiate between a person who is authorised to move a vehicle 35 and a person who is not. For example emergency services such as the fire department may be entitled to move a vehicle by towing or by using a universal key if the vehicle 35 is blocking an emergency. Image recognition may be used to detect the uniforms or labels on the vehicles or any other suitable item. In such cases it might be determined that the vehicle 35 is not exposed to risk and so the defensive mode is not activated. It may also be determined that other nearby vehicles 35 are also not exposed to risk and so there would be no need for the other vehicles 35 to enter the defensive mode. In some examples the vehicles 35 may send messages to the users of the vehicles 35 which may inform them that their vehicle 35 has been moved or that nearby vehicles 35 have been moved.

Apparatus and methods as described above enable situations which may present a risk to a vehicle or owner of a vehicle 35 to be detected. This may enable a defensive mode of operation to be activated to minimise any damage which may be caused to the vehicle 35.

In some examples the information may be obtained from a plurality of vehicles 35. This may enable patterns or activity of people to be recognised more accurately. It may also enable a defensive mode of operation to be coordinated between a plurality of vehicles 35. This may provide a more effective way of deterring potential criminals and may also enable people or objects who have damaged any vehicles 35 to be tracked.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
processing circuitry; and
memory circuitry including computer program code;
the memory circuitry and the computer program code configured to, with the processing circuitry, cause the apparatus at least to perform:
obtaining information from a plurality of sensors wherein the plurality of sensors are located on a plurality of vehicles;
analysing the obtained information to determine whether at least one vehicle is exposed to risk; and
after it is determined that at least one vehicle is exposed to risk, enabling one or more of the plurality of vehicles to activate a defensive mode of operation wherein the defensive mode of operation comprises causing notification of one or more other vehicles located so as to encounter a person or object that created the risk in order to facilitate monitoring of the person or object that created the risk by the one or more other vehicles.

2. The apparatus as claimed in claim 1 wherein at least one vehicle is determined to be exposed to risk if the information obtained from the plurality of sensors comprises a predetermined pattern.

3. The apparatus as claimed in claim 1 wherein at least one vehicle is determined to be at risk if the information obtained from the plurality of sensors is above a threshold.

4. The apparatus as claimed in claim 1 wherein the information obtained from the plurality of sensors enables an activity of at least one person to be monitored.

5. The apparatus as claimed in claim 1 wherein the information which is obtained is analysed to define a category of risk which at least one vehicle is exposed to.

6. The apparatus as claimed in claim 5 wherein functions performed in the defensive mode of operation are determined by the category of risk to which the at least one vehicle is exposed.

7. The apparatus as claimed in claim 1 wherein the defensive mode of operation comprises providing information to other vehicles.

8. The apparatus as claimed in claim 1 wherein the defensive mode of operation comprises contacting users of vehicles.

9. The apparatus as claimed in claim 1 wherein the defensive mode of operation further comprises autonomously controlling at least one vehicle to move away from the risk.

10. The apparatus as claimed in claim 1 wherein the apparatus is further caused to identify the person or object that created the risk.

11. The apparatus as claimed in claim 1 wherein the apparatus is caused to cause notification of one or more other vehicles located in a direction in which the person or object that created the risk is heading.

12. An apparatus comprising:
processing circuitry; and
memory circuitry including computer program code;
the memory circuitry and the computer program code configured to, with the processing circuitry, cause the apparatus at least to perform:
obtaining information from a plurality of sensors wherein the plurality of sensors are located on a plurality of vehicles;
analysing the obtained information to determine whether at least one vehicle is exposed to risk; and
after it is determined that at least one vehicle is exposed to risk, enabling one or more of the plurality of vehicles to activate a defensive mode of operation wherein the defensive mode of operation comprises autonomously controlling at least one vehicle to move away from the risk, wherein the defensive mode of operation further comprises autonomously controlling at least one vehicle to move back to its original location if the risk is removed.

13. The apparatus as claimed in claim 1 wherein the apparatus is embodied by a vehicle.

14. The apparatus as claimed in claim 1 wherein the apparatus embodied by a server that is configured to communicate with at least one vehicle.

15. A method comprising:
obtaining information from a plurality of sensors wherein the plurality of sensors are located on a plurality of vehicles;
analysing the obtained information to determine whether at least one vehicle is exposed to risk; and
after it is determined that at least one vehicle is exposed to risk, enabling one or more of the plurality of vehicles to activate a defensive mode of operation wherein the defensive mode of operation comprises causing notification of one or more other vehicles located so as to encounter a person or object that created the risk in order to facilitate monitoring of the person or object that created the risk by the one or more other vehicles.

16. The method as claimed in claim 15 wherein the defensive mode of operation further comprises autonomously controlling at least one vehicle to move away from the risk.

17. The method as claimed in claim 15 further comprising identifying the person or object that created the risk.

18. A non-transitory computer-readable storage medium storing a computer program comprising computer program instructions that, when executed by processing circuitry, enable:
obtaining information from a plurality of sensors wherein the plurality of sensors are located on a plurality of vehicles;
analysing the obtained information to determine whether at least one vehicle is exposed to risk; and
after it is determined that at least one vehicle is exposed to risk, enabling one or more of the plurality of vehicles to activate a defensive mode of operation wherein the defensive mode of operation comprises causing notification of one or more other vehicles located so as to encounter a person or object that created the risk in order to facilitate monitoring of the person or object that created the risk by the one or more other vehicles.

19. The non-transitory computer-readable storage medium as claimed in claim 18 wherein the defensive mode of operation further comprises autonomously controlling at least one vehicle to move away from the risk.

20. The non-transitory computer-readable storage medium as claimed in claim 18 wherein the computer program instructions, when executed by processing circuitry, further enable identifying the person or object that created the risk.

\* \* \* \* \*